United States Patent Office 3,522,333
Patented July 28, 1970

3,522,333
PHOSPHONAMIDE SULFONATES
Robert E. Leary, Somerville, and Leslie M. Schenck, Mountainside, N.J., assignors to GAF Corporation, New York, N.Y., a corporation of Delaware
No Drawing. Filed June 1, 1967, Ser. No. 642,728
Int. Cl. C07f 9/924; C11d 3/36; C10m 7/46
U.S. Cl. 260—947                8 Claims

ABSTRACT OF THE DISCLOSURE

An anionic surfactant comprising a compound having the following empirical formula:

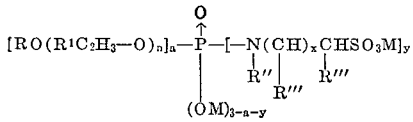

wherein R represents an alkyl group containing 8 to 22 carbon atoms or an alkylphenol group containing 12 to 24 carbons, R' represents hydrogen or a lower alkyl group containing 1 to 4 carbon atoms, $n$ is an integer varying from 1 to 150, $a$ is an integer varying from 1 to 2, R" represents hydrogen, an alkyl group containing 1 to 6 carbon atoms, cycloalkyl and aryl radicals, R''' represents hydrogen, methyl or ethyl, $x$ is an integer varying from 1 to 5, $y$ is an integer varying from 1 to 2, and M is selected from the group consisting of hydrogen, ammonium and a metal. The products of the above formula are useful as anionic surfactants as well as being useful antistats, emulsifiers, lubricants, petroleum additives and the like. The products are prepared by reaction of a sulfonated aliphatic amine with a chlorophosphate, the latter prepared by the reaction of phosphorus oxychloride and an alkylated phenol or alcohol.

BACKGROUND OF THE INVENTION

Field of the invention

This invention relates to novel anionic surfactant materials comprising a series of substituted phosphate ester amide sulfonates in which the hydrophobic portion of the molecule is supplied by an alkylated phenol or alcohol substituted chlorophosphate or wherein the phenol or alcohol has been further modified by an alkylene oxide and the water solubilizing portion is furnished by a sulfonated aliphatic amine. These products are also useful as antistats, emulsifiers, lubricants, petroleum additives and the like.

Description of the prior art

Substituted phosphate ester amide sulfonates of the type of this invention are novel compounds and have not been known heretofore in the prior art. The most pertinent prior art relating to such materials of which applicant is aware is contained in U.S. Pats. Nos. 3,013,035 and 3,013,036 to Huber et al., issued Dec. 12, 1961 which relates to processes for the production of surface active agents by the reaction of an amino alkane sulfonic acid with a fatty acid chloride to prepare carboxylic acid ester amide sulfonates.

SUMMARY OF THE INVENTION

It is accordingly one object of the present invention to provide a series of substituted phosphate ester amide sulfonates which are multi-purpose surfactants for various applications and are advantageous over similar surfactant materials known to the prior art.

A further object of the invention is to provide a series of substituted phosphate ester amide sulfonates in which the hydrophobic portion of the molecule is supplied by an alkylated phenol or alcohol substituted-chlorophosphate and the water solubilizing portion is furnished by a sulfonated aliphatic amine, the products being useful as anionic surfactants.

A still further object of the present invention is to provide a process for preparing a series of substituted phosphate ester amide sulfonates which comprises reacting an alkylated phenol or alcohol, ore their alkylene oxide reaction product, with phosphorus oxychloride and reacting the resultant chlorophosphate with a sulfonated aliphatic amine compound to produce the anionic surfactant products of this invention.

Other objects and advantages of the present invention will become obvious to those skilled in the art as the description thereof proceeds.

According to the present invention and in satisfaction of the foregoing objects and advantages, there is provided by this invention a novel series of anionic surfactant compounds comprising those of the following empirical formula:

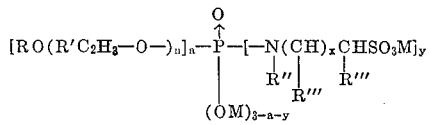

wherein R is selected from the group consisting of an alkyl radical containing 8 to 22 carbon atoms and an alkyl phenol radical containing 12 to 24 carbon atoms, R' is selected from the group consisting of hydrogen and a lower alkyl radical containing from 1 to 4 carbon atoms, $n$ is an integer varying from 1 to 150, $a$ is an integer varying from 1 to 2, R" is hydrogen, an alkyl radical containing from 1 to 6 carbon atoms, cycloalkyl and aryl radicals, R''' represents hydrogen, methyl or ethyl, $x$ is an integer varying from 1 to 5, $y$ is an integer varying from 1 to 2 and M is selected from the class consisting of hydrogen, ammonium and a metal.

The above products are prepared by the initial reaction of an alkylated phenol or alcohol or their alkylene oxide reaction product, with phosphorus oxychloride to form the corresponding chlorophosphates and the subsequent reaction of this intermediate with a sulfonated aliphatic amine in the presence of a base to produce the resulting phosphate ester amide sulfonates.

The phosphate ester amide sulfonates of this invention incorporate several functional groups into the molecule and are useful as multi-purpose surfactants in various applications as well as lending themselves to uses such as antistats, emulsifiers, lubricants, petroleum additives and the like. The products generally comprise a chlorophosphate hydrophobic portion of the molecule which is supplied by reaction of an alkylated phenol or alcohol or their alkylene oxide reaction product, with phoshporus oxychloride and a water solubilizing portion of the molecule furnished by a sulfonated aliphatic amine.

The physical state of the products may be that of a solution, slurry or powder and they display outstanding detergency characteristics either alone or in combination with phosphate or silicate builders. Their mutual compatibility with soaps, ionic and nonionic surfactants, provides great versatility to the products.

DESCRIPTION OF PREFERRED EMBODIMENTS

As pointed out hereinabove, the novel compounds of this invention are produced by the general reaction of an alkylated phenol or alcohol or their alkylene oxide reaction products, with phosphorus oxychloride to produce the hydrophobic portion of the molecule which is subsequently reacted with the sulfonated aliphatic amine. Alkylated phenols and alcohols are of course well known in the art and may be employed "as is'" as initial starting materials. However, preferred starting materials for the invention comprise the alkylated phenols and alcohols modified by condensation with an alkylene oxide, these products comprising those of the following formula:

$$RO-(R'C_2H_3-O)_nH$$

wherein R is selected from the group consisting of an alkyl radical containing 8 to 22 carbon atoms and an alkyl phenol radical containing 12 to 24 carbon atoms, R' is hydrogen or a lower alkyl radical containing 1 to 4 carbon atoms and $n$ is an integer varying from 1 to 150. These products, as pointed out above, may be prepared by reaction of the appropriate alcohol or phenol with an alkylene oxide.

Specific condensed alkylated phenols and alcohols corresponding to the above formula are those obtained by the reaction of $C_{12}$ primary alcohols, octano-1, docosanol, hexylphenol, $C_{18}$ alkyl phenol, nonyl phenol, lauryl alcohol, etc. with the appropriate molar ratio of an alkylene oxide, such as ethylene oxide, propylene oxide, styrene oxide, etc. as well as mixtures of these materials, to produce the desired alkylated alcoholic or phenolic starting materials. Specific examples of the products contemplated prepared as set forth above are ethoxylates of a $C_{12}$ primary alcohol, mono-ethoxylate of dodosanol, and lauryl alcohol tetra ethyoxylate. Other starting materials of this type will become obvious to those skilled in the art from an understanding of the present specification.

To form the intermediates for use in the process of this invention, 1 to 2 moles of the above identified alkylated phenols or alcohols, which may be generally referred to as alkyloxy-poly (alkyleneoxy) alkanol or alkylaryloxypoly (alkylenoxy) alkanols, are reacted with one mole of phosphorus oxychloride at a temperature of about 10° C. to about 70° C. After the addition is complete, the mixture is purged with air or nitrogen to remove the hydrogen chloride formed in the reaction. There is thus recovered the chlorophosphates to be employed in forming the novel products of the present invention.

To form the novel products of the invention the chlorophosphates obtained by the above reaction, are reacted with an aqueous solution of a sulfonated aliphatic amine in the presence of a basic material as specifically described hereinafter.

The sulfonated aliphatic amines to be reacted with the chlorophosphates are well known in the art and may be described by the following empirical formula:

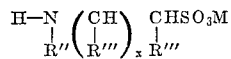

wherein R''' represents hydrogen, methyl or ethyl and R'' is selected from the group consisting of hydrogen, an alkyl radical containing 1 to 6 carbon atoms, cycloalkyl and aryl radicals, $x$ is an integer varying from 1 to 5, and M is hydrogen, ammonium or a metal. Of the various types of sulfonated aliphatic amines which may be employed in forming the products of this invention, the 2-amino alkane sulfonic acid salts represent preferred reactants, the materials usually being referred to as "taurines," representing a preferred class of reactants.

The preferred "taurine" type materials may be represented by the following formula:

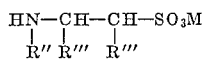

wherein R''' represents hydrogen, methyl or ethyl, and R'' represents hydrogen, an alkyl radical having 1 to 6 carbons, cycloalkyl and aryl radicals, and M represents an alkali or alkaline earth metal, for example sodium, potassium, lithium, etc.

As examples of 2-amino alkane sulfonic acids which are preferred for use in the present invention in the form of their alkali or alkaline earth metal salts, the following may be mentioned: taurine, N-methyl taurine, N-ethyl taurine, N-propyl taurine, N-amyl taurine, N-isobutyl taurine, etc.

These amine sulfonates are reacted with the chlorophosphates in the presence of a base such as sodium hydroxide, potassium hydroxide, and the like, the base being employed as about a 20% to 50% aqueous solution, to form the products of this invention.

The reaction is carried out preferably employing about ½ to 1 mole of the chlorophosphate to about 1 mole of the sulfonated aliphatic amine for optimum results although the molar ratio to be employed is not particularly critical.

The reaction is carried out over a temperature range of about 10° C. to about 90° C. with a preferred operating range of 15° C. to 40° C. as this provides the most economical operation of the process. The reaction may be carried out as a batch process or it may be carried out under a continuous operation as desired.

In practicing the process of the invention in forming the novel anionic surfactants, about ½ to 1 mole of the chlorophosphate is gradually added to an aqueous solution containing about 1 mole of the alkali metal salt of the amino aliphatic sulfonic acid while simultaneously neutralizing the resultant sodium salt hydrochloride by the addition of an equimolar quantity of an alkali metal hydroxide, such as sodium or potassium hydroxide, thereby liberating the amine. A sufficient quantity of additional water should be added during the reaction to maintain the reaction mixture in a fluid state.

In accordance with the process of the invention, the pH range of the reaction of the mixture will vary at different stages of processing from about 6.0 to about 10.6. This is the pH range in which the equilibrium considerations permit the existence of appreciable amounts of both types of intermediates which constitute useful buffering ranges.

The resulting phosphonamide sulfonate obtained by this reaction may be used as obtained or converted to flake or powder form as desired.

The following examples will illustrate the nature of the process in preparing the novel products of this invention and are not to be considered as limitative thereon.

EXAMPLE I

To 376 grams (1 mole) of the four mole ethoxylate of a commercial $C_{12}$ primary alcohol was added 102 grams (0.667 mole) of phosphorus oxychloride over a period of one hour at 35° C. After the addition was complete, the system was purged with nitrogen to remove free hydrogen chloride. The purging was stopped when the percent chloride was slightly over 9% (theoretical= 8.03%). The chlorophosphate corresponds to a material having an average of 1.5 moles of alkyethoxylate and 1.5 moles of chloride per phosphorus atom.

The chlorophosphate, 400 grams (0.605 mole) was added to 372 grams (0.81 mole) of a 35% N-methyl taurine aqueous solution and simultaneously 181 grams 1.36 moles) of 30% sodium hydroxide was added to accept the liberated hydrogen chloride. The reaction was conducted over 1.5 hours at 35–40° C. while maintaining a pH of 10. An additional 400 g. of water was added during the course of reaction to maintain a fluid product. There was obtained 1322 g. of product which analyzed 40.9% activity by standard hyamine titration indicating essentially quantitative conversion to the desired sodium phosphonamide sulfonate.

The product had the following approximate structural formula:

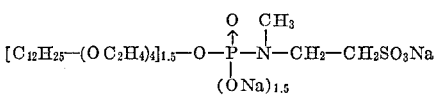

The product had a Ross-Miles Foam value of 83/73 mm. (5 min.) and a Lime Soap Dispersion value 15%.

EXAMPLE II

Octanol-1, condensed with 150 moles of ethylene oxide, 673 grams (0.1 mole), was reacted with 51.2 grams (0.1 mole) of phosphorus oxychloride as described in Example I. The system was purged with nitrogen until the percent chloride was reduced to 1.1%. Then 684.7 grams (0.1 mole) of the dichlorophosphate was reacted with 46 grams (0.1 mole) of 35% sodium N-methyl taurate and 29 grams (0.22 mole) of 30% sodium hydroxide as described in Example I. During the reaction 1540 g. of water was added to the mixture. The product had a methylene blue activity of 25.5% compared to a theoretical value of 30%.

EXAMPLE III

Operating as in Example I, 0.1 mole of the monoethoxylate of docosanol was reacted with 0.1 mole of phosphorus oxychloride. After removing the liberated hydrogen chloride, and repeating the procedure of Example I, except ammonium hydroxide was substituted for sodium hydroxide, 0.1 mole of the dichlorophosphate was condensed with 0.1 mole of ammonium N-methyl taurate. Analysis of the product of methylene blue indicated that the product yield was 0.092 mole.

EXAMPLE IV

Hexylphenol condensed with six moles of ethylene oxide plus one mole of propylene oxide (0.2 mole) was reacted with 0.1 mole of phosphorus oxychloride in a manner similar to that described in Example I. The resulting monochlorophosphate was reacted with 0.1 mole of potassium N-methyl taurate to give a product having the following structure in 89% of the theoretical yield.

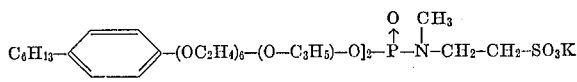

EXAMPLE V

The procedure of Example I was repeated in which a $C_{18}$ alkylphenol was condensed with 15 moles of ethylene oxide (0.1 mole) and then reacted with 0.1 mole of phosphorus oxychloride. The dichlorophosphate obtained was added to 0.1 mole of sodium N-cyclohexyl taurate as described in Example I. As determined by methylene blue analysis, the corresponding phosphonamide sulfonate was obtained in 94% of the theoretical yield.

EXAMPLE VI

Nonylphenol was condensed with five moles of ethylene oxide and one mole of styrene oxide (0.1 mole) and then was reacted with 0.1 mole of phosphorus oxychloride as described in Example I. Condensation of the dichlorophosphate with 0.1 mole of sodium taurate gave a 96% yield of the corresponding phosphonamide sulfonate as determined by methylene blue analysis.

EXAMPLE VII

Operating as in Example I, 0.1 mole of the dichlorophosphate, obtained by reaction of 0.1 mole of phosphorus oxychloride and 0.1 mole of lauryl alcohol tetraethoxylate, was condensed with two moles of sodium N-methyl taurate. Methylene blue analysis indicated that the alkylethoxy phosphonodiamidosulfonate was obtained in 75% of the theoretical yield.

What is claimed is:

1. A compound of the following formula:

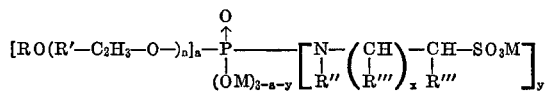

wherein R is selected from the class consisting of an alkyl radical containing 8–22 carbon atoms and alkyl phenol radical containing from 12–24 carbon atoms, R' is selected from the class consisting of hydrogen and methyl, R" is selected from the class consisting of hydrogen, an alkyl radical containing from 1–6 carbon atoms and cyclohexyl, R''' is selected from the group consisting of hydrogen and methyl, n is an integer varying from 1 to 150, a is an integer varying from 1–2, x is an integer varying from 1–5, y is an integer varying from 1–2 and M is selected from the group consisting of hydrogen, ammonium, an alkali metal and an alkaline earth metal.

2. A compound according to claim 1 wherein a is 1, x is 1, y is 1, and M is an alkali metal.

3. A compound according to claim 2 wherein R is alkyl of 8–22 carbon atoms, R' is hydrogen, R" is alkyl of 1–6 carbon atoms, and R''' is hydrogen.

4. A compound according to claim 1 wherein a is 2, x is 1 and y is 1 and M is an alkali metal.

5. A compound according to claim 4 wherein R is an alkyl phenol containing 12–24 carbon atoms, R' is hydrogen, R" is methyl, R''' is hydrogen and M is sodium.

6. A process for the production of substituted phosphate ester amide sulfonates of the following formula:

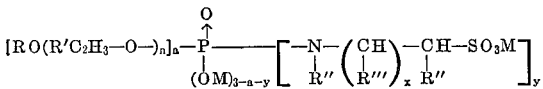

wherein R is selected from the class consisting of an alkyl radical containing 8–22 carbon atoms and an alkyl phenol radical containing 12–24 carbon atoms, R' is selected from the class consisting of hydrogen and methyl, R" is selected from the class consisting of hydrogen, an alkyl radical containing from 1–6 carbon atoms and cyclohexyl, R''' is selected from the group consisting of hydrogen and methyl, n is an integer varying from 1 to 150, a is an integer varying from 1 to 2, x is an integer varying from 1–5, y is an integer varying from 1–2 and M is selected from the group consisting of hydrogen, ammonium, an alkali metal and an alkaline earth metal, which comprises reacting a compound of the formula:

wherein R and R' are as above, with phosphorous oxychloride at a temperature of about 10–70° C. and reacting the resultant product with an aqueous solution of a sulfonated aliphatic amine of the formula:

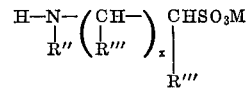

in the presence of a base of the formula MOH, wherein M is as above, at a temperature of about 10–90° C. and recovering the product produced.

7. A process according to claim 6 where in a is 1, x is 1, y is 1, and M is an alkali metal.

8. A process according to claim 7 wherein R is alkyl of 8–22 carbon atoms, R' is hydrogen, R" is alkyl of 1–6 carbon atoms and R''' is hydrogen.

References Cited

UNITED STATES PATENTS 2,855,426  10/1958  Kauer et al. _____ 260—974 XR
3,298,937  1/1967   Strauss et al. ____ 260—947 XR CHARLES PARKER, Primary Examiner A. H. SUTTO Assistant Examiner U.S. Cl. X.R.

260—984, 974; 252—135, 137, 32.7, 46.4, 46.6